United States Patent Office 3,425,688
Patented Feb. 4, 1969

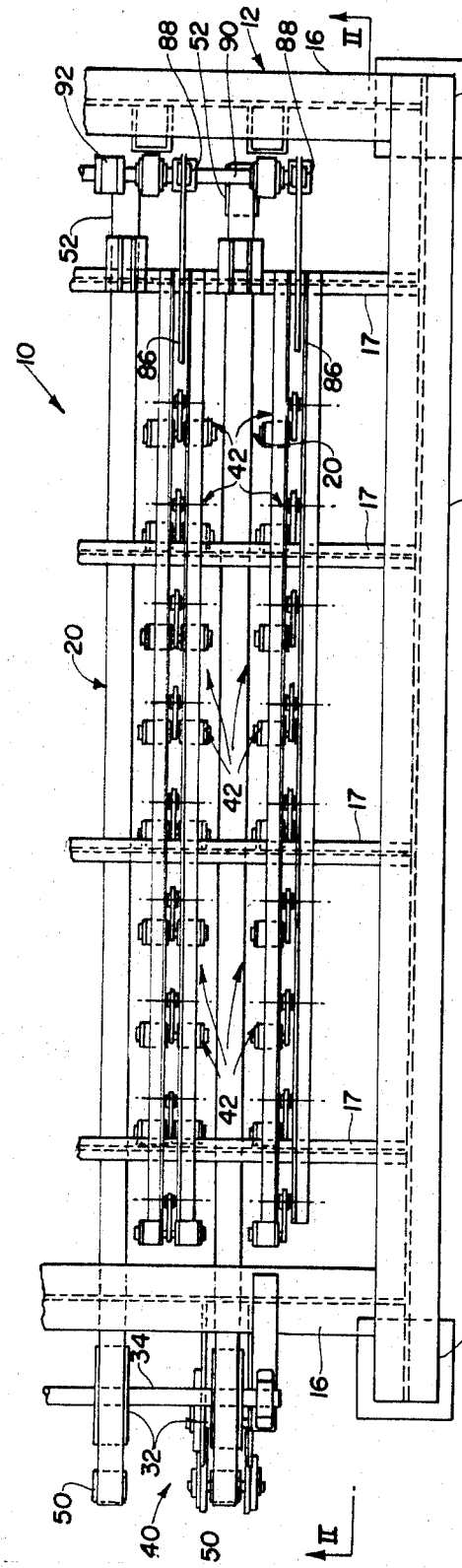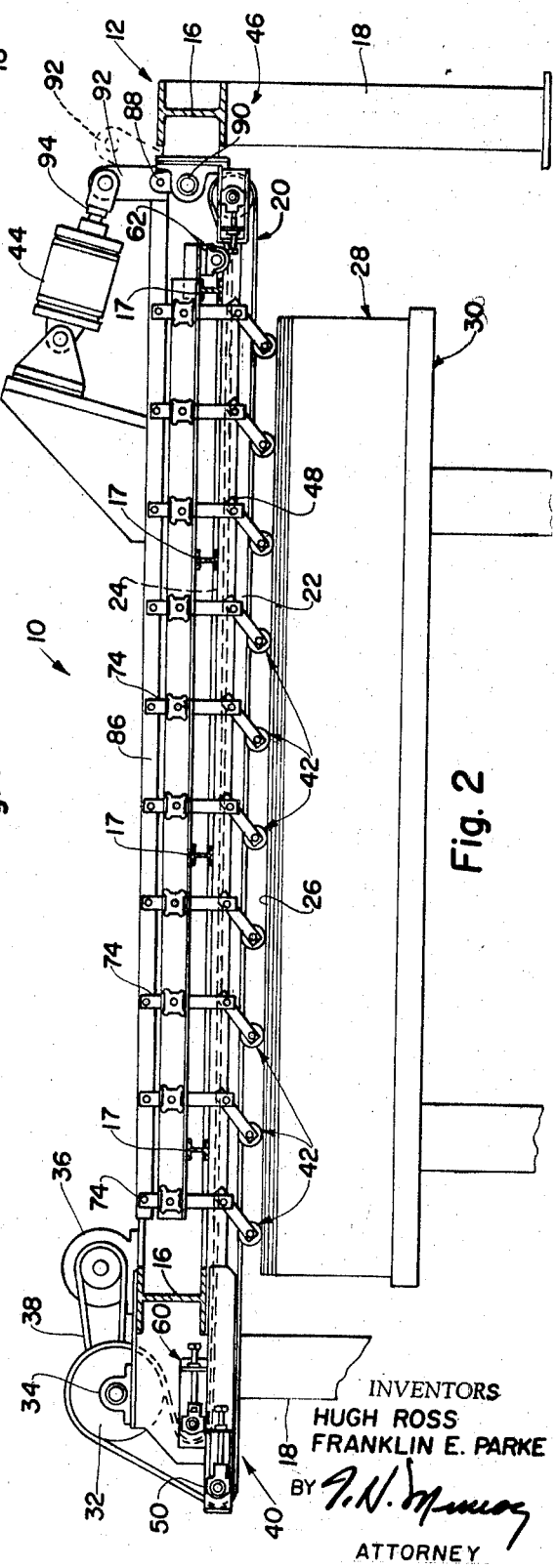

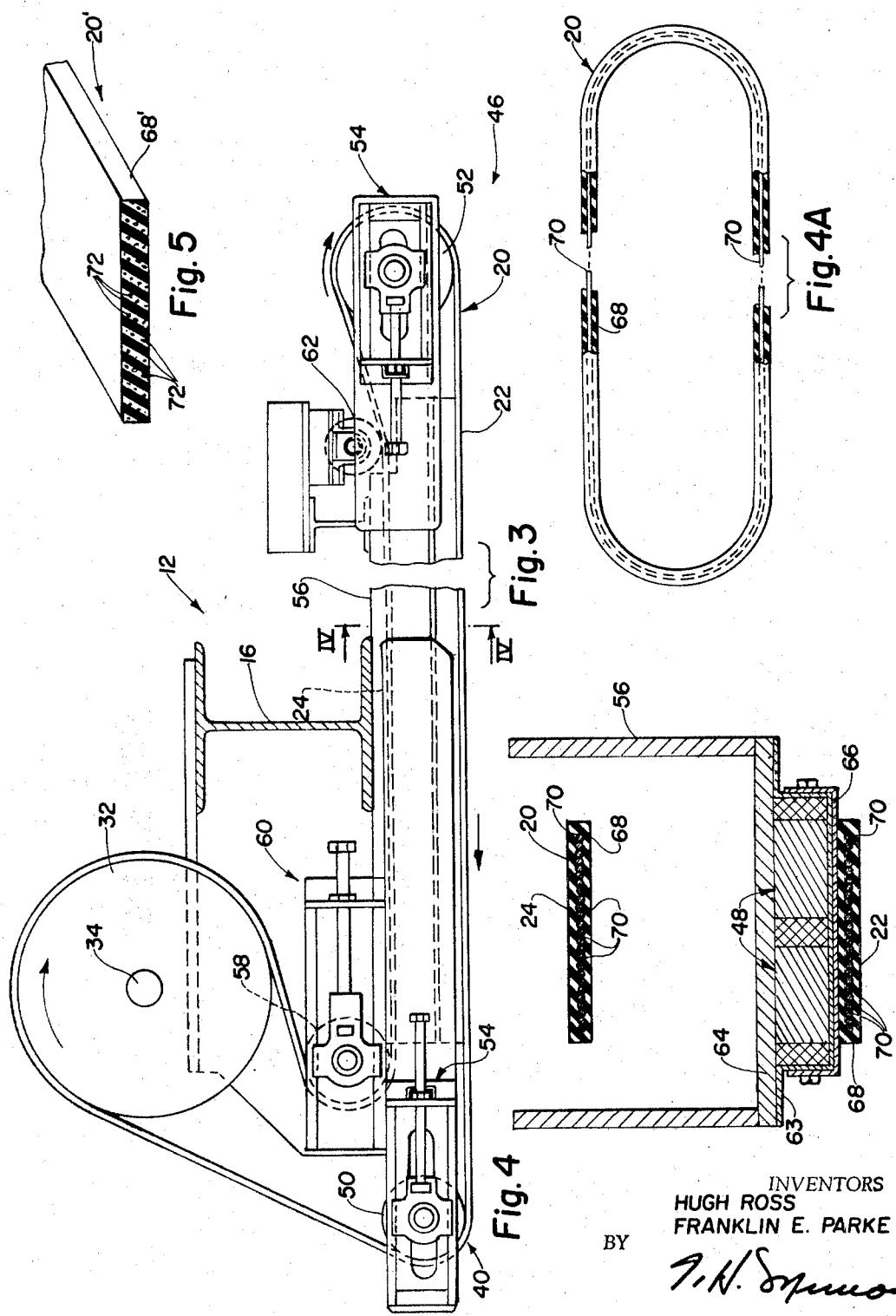

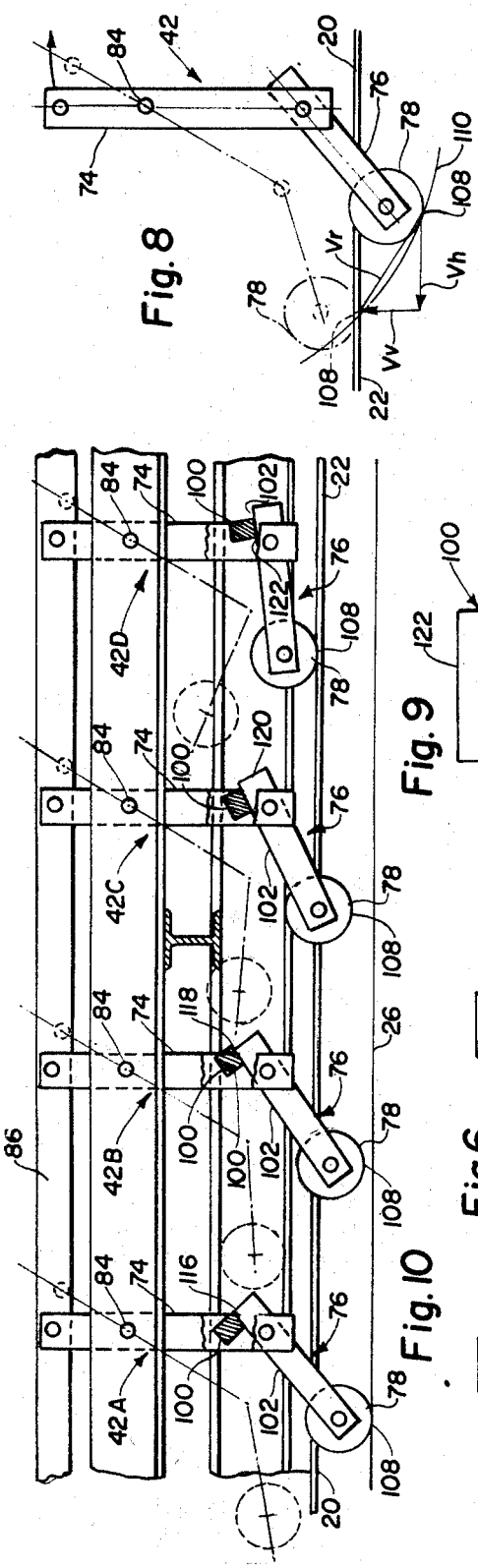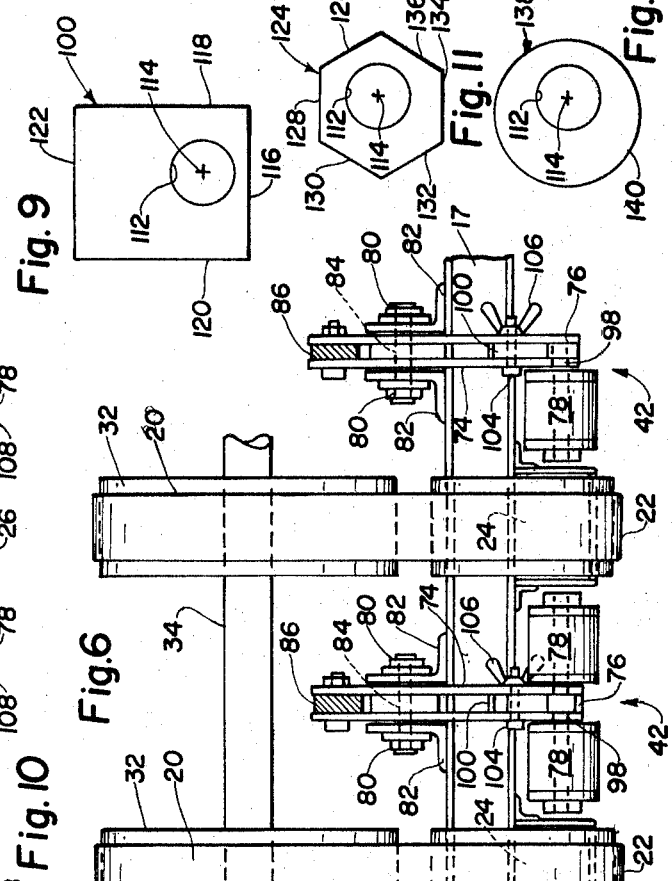

3,425,688
MAGNETIC CONVEYOR
Hugh Ross and Franklin E. Parke, Pittsburgh, Pa., assignors to Ropak Manufacturing Co., Pittsburgh, Pa., a corporation of Pennsylvania
Filed Dec. 23, 1966, Ser. No. 604,443
U.S. Cl. 271—75       8 Claims
Int. Cl. B65h 29/16, 3/16

ABSTRACT OF THE DISCLOSURE

This invention relates to a conveyor of the type employing magnet means and one or more movable belts each having a lower reach positioned below the magnet means for conveying single sheets of paramagnetic material, such as, steel sheets. The belts are magnetically susceptible and are attracted by the magnets whereby the lower reaches are prevented from sagging below the magnets in the absence of material being conveyed. The present conveyor also provides transfer means including magnetic rollers for transferring a single sheet from a position spaced below the conveyor into engagement with the movable belts. The magnetic rollers are carried on adjustable arms which are arranged to accelerate each single sheet from a dead stop to a speed which prevents the sheet from being marked when it engages the moving belt.

Background of the invention

Field of the invention.—This invention relates to magnetic conveyors for conveying single sheets of paramagnetic material such as steel sheets, and more particularly to improvements in the construction and operation of such conveyors.

Description of the prior art.—There are numerous magnetic conveyors described in the prior art, which employ rows of aligned magnets and one or more movable belts having lower reaches positioned below the magnets and adapted to convey single sheets of paramagnetic material. See, for example, U.S. Patent Nos. 2,486,733; 2,996,297 and 3,229,805. In our issued Patent No. 3,224,757 there is disclosed a similar magnetic conveyor provided with transfer means for transferring single sheets of paramagnetic material between a first position wherein the sheet is engaged with the movable belts and a second position which is spaced below the conveyor. The transfer means includes magnetic rollers which magnetically support the single sheet during transfer between the aforesaid positions.

As is conventional in such prior art magnetic conveyors, the lower reach of the belt extends between end pulleys positioned at the opposite ends of the conveyor. The lower reach is unsupported throughout its length and, therefore, tends to sag at its central region and is disengaged from a wear plate normally disposed between the belt and the magnets. Because of this belt sag condition, the overall length of the magnetic conveyors has been limited. In magnetic conveyors of a maximum permissible length, sagging of the belt has been somewhat minimized by placing the belt under tension. This, of course, requires complex take-up mechanisms and, in time, causes the belt to stretch whereupon further take-up is necessary. At some future time, the elastic limit of the belt is exceeded causing the belt to break and requiring replacement of the belt.

In certain prior art magnetic conveyors, belt sag has been eliminated by providing one or more support rollers positioned at spaced locations between the aforesaid end pulleys. In this arrangement, the lower reach extends horizontally below a set of aligned magnets, upwardly over a support roll and downwardly, and then horizontally along a second set of aligned magnets. One disadvantage associated with this arrangement is that the overall cost of the magnetic conveyor is increased by the addition of the support rollers. A second disadvantage in this arrangement is the fact that a discontinuity in the lower reach is introduced at each of the support rollers. That is to say, the lower reach does not extend continuously throughout the length of the magnetic conveyor. A third disadvantage in some prior art conveyors is the fact that there also occurs at each support roller, a break in the continuity of the magnetic field supporting the single sheet being conveyed. Hence, certain portions of the sheet being conveyed are unsupported during their conveyance by the magnetic conveyor.

The use of magnetic rollers supported on pivotal arms for transferring single sheets to and from the conveyor is disclosed in our U.S. Patent No. 3,224,757. This arrangement for transferring sheets may be used for stacking operations during which the sheets are stacked at a preselected location, or for destacking operations wherein single sheets are raised from the stack and conveyed for further processing. During destacking, the sheets are accelerated from a dead stop to a speed whereby, ideally, the sheet is not marked when it engages the belt. As should be evident, the velocity of the belt is greater than the velocity of the sheet being brought into engagement therewith. Consequently, the greater the acceleration of the single sheet from a dead stop, the less chance there is that the sheet will be marked.

Summary of the invention

In accordance with the present invention, apparatus is provided for conveying paramagnetic material, such as steel sheets. The apparatus of the invention comprises a support frame having magnet means extending along the length thereof for attracting the paramagnetic material. At least one movable belt is provided having a lower reach positioned below the magnets for engagement by and conveyance of the paramagnetic material. In accordance with the invention, the belt is magnetically susceptible whereby the lower reach is attracted by the magnet means and prevented from sagging below the support frame in the absence of material being conveyed. Accordingly, substantially any length conveyor can be produced without having the disadvantage of a sagging belt.

Further in accordance with the present invention, improved magnetic transfer means incorporating magnetic rollers, are positioned on opposite sides of the belt for transferring single sheets between a first position spaced below the lower reach and a second position engaged with the lower reach. As will become apparent, the present magnetic transfer means is arranged such that the magnetic roller and the single sheet supported thereby are caused to move parallel to and with the lower reach at a speed which is greater than the speed at which the magnetic roller and the sheet move in a direction normal to the lower reach. The present magnetic transfer means causes the single sheet being transferred to undergo a greater acceleration than heretofore possible by similar prior art devices. Further in accordance with the present invention, the magnetic transfer means is adjustable such that the magnetic roller may be adjusted from a first extreme lower position wherein the roller is spaced below the lower reach to an extreme upper position wherein the roller is above the lower reach and incapable of transferring single sheets of paramagnetic material.

As an overall object, the present invention seeks to provide an improved magnetic conveyor of the type described which can be manufactured in any desired length.

Another object of the present invention is to provide a magnetic conveyor having a belt which does not sag regardless of the overall length of the conveyor.

A further object of the present invention is to provide improved magnetic transfer means for transferring single sheets to the conveyor in a manner which minimizes and in some cases completely eliminates marking of the sheet when the sheet engages the moving belt.

A still further object of the present invention is to provide improved magnetic transfer means employing a magnetic roller, wherein the position of the magnetic roller may be adjusted relative to the lower reach.

*Description of the drawings*

The above and other objects and advantages of the present invention will become apparent from the following detailed description by reference to the accompanying drawings, in which:

FIGURE 1 is a fragmentary plan view of the present magnetic conveyor;

FIG. 2 is a cross-sectional view taken substantially along the line II—II of FIG. 1;

FIG. 3 is a side view, on an enlarged scale, illustrating a pulley arrangement for supporting a movable belt employed in the present magnetic conveyor;

FIG. 4 is a cross-sectional view taken along the line IV—IV of FIG. 3;

FIG. 4A is a fragmentary side view, partly in cross section, schematically illustrating a movable belt of the present invention;

FIG. 5 is a fragmentary isometric view, in cross section, illustrating an alternative embodiment of the present belt;

FIG. 6 is a fragmentary end view of the present magnetic conveyor, illustrating magnetic transfer means employed therein;

FIG. 7 is a fragmentary side view, on an enlarged scale, further illustrating the magnetic transfer means of the present invention;

FIG. 8 is a schematic side view of the present magnetic transfer means illustrating certain principles of its operation;

FIG. 9 is a side view of a cam member used in the present magnetic transfer means for adjusting the position of the magnetic rollers;

FIG. 10 is a fragmentary side view of the present magnetic conveyor illustrating four possible positions of a magnetic roller carried on the present magnetic transfer means; and FIGS. 11 and 12 are side views illustrating alternative embodiments of the cam member.

*General description*

Referring now to FIGS. 1 and 2, a magnetic conveyor 10 is illustrated which comprises a horizontal, generally rectangular frame 12 including longitudinal frame members 14, end frame members 16 and intermediate frame members 17. The frame 12 is supported on columns 18 which may be of any desired height. The frame 12 supports a number of movable belts 20 each having a lower reach 22 and an upper reach 24. The belts 20 are spaced apart across the width of the frame 12 and operate in unison to convey a single sheet 26 of paramagnetic material, such as steel sheet.

A stack 28 of the sheets 26 is positioned below and spaced from the lower reach 22. The stack 28 rests on a lift table 30 of the type which may be raised incrementally from time-to-time to position the uppermost sheet of the stack 28 at an appropriate level relative to the conveyor 10. The lift table 30 is conventional in the art and does not require additional description.

The movable belts 20 are frictionally engaged with drive pulleys 32 carried on a common shaft 34. Motor means 36 supported on the frame 12 is drivingly connected to the common shaft 34 by a drive chain 38. If desired, a transmission (not shown) may be interposed between the motor means 36 and the drive chain 38 to effect a change in the speed of the movable belts 20. In operation, the drive pulleys 32 rotate in a clockwise direction whereby the lower reaches 22 move from right to left of FIG. 2 and such that single sheets are conveyed toward and beyond a forward end 40 of the frame 12.

The present magnetic conveyor 10 also includes a plurality of magnetic transfer means 42 which cooperate to transfer the single sheet 26 from the stack 28 into engagement with the lower reach 22 whereupon the single sheet 26 is conveyed toward and past the forward end 40 of the frame 12, to further processing. As best shown in FIG. 1, a row of the magnetic transfer means 42 is provided on opposite sides of each of the movable belts 20. As will be more fully described, the magnetic transfer means 42 are operated, in unison, by a pneumatic cylinder 44 (FIG. 2) mounted at the rear end 46 of the frame 12.

As will also be more fully described, the position of each of the magnetic transfer means 42 relative to the lower reach 22 may be changed. Furthermore, one or more of the magnetic transfer means 42 may be repositioned such that they are incapable of attracting the single sheet 26. The overall arrangement is such that any number of the transfer means 42 may be employed to transfer the single sheet 26 from the stack 28 to the lower reach 22. In this connection, it should be evident that when a heavy gauge sheet 26 is to be transferred, more of the magnetic transfer means 42 will be required to transfer the same as compared to the number of magnetic transfer means 42 required to transfer a lighter gauge single sheet.

Double sheeting (picking up two sheets rather than one) can also be prevented by the use of a smaller number of magnetic transfer means 42. Double sheeting occurs when the top sheet is saturated with magnetic flux lines and their remains additional attraction power which also attracts the second sheet. A decrease in the number of magnetic transfer means 42 decreases the additional attraction power to a value below that required to raise the second sheet.

It is also to be noted that the sheets 26 of the stack 28 may be any desired length, their length being determined, of course, by the overall distance between the endmost transfer means 42.

The present magnetic conveyor 10 also includes elongated magnet means 48, one positioned above each of the lower reaches 22 and supported by the frame 12.

*Movable belts 20*

Referring now to FIGS 3, 4 and 4A, the lower reach 22 of each of the movable belts 20 extends between end idlers 50, 52. Each of the end idlers 50, 52 has associated therewith take-up means 54 carried on a U-shaped frame 56, best illustrated in FIG. 4. The lower reach 22 extends around the end idler 50 up over the drive pulley 32 and thence around an intermediate idler pulley 58 also adjustably supported on take-up means 60. The upper reach 24 extends from the intermediate idler 58 beneath a second intermediate idler 62 and then around the end idler 52. The several take-up means 54, 60 are employed to take up any initial slack in the belt 20 and permit adjusting the idler rollers 50, 52 and 58 such that the movable belt 20 runs true, that is, does not wobble from side-to-side.

In accordance with the present invention, each of the movable belts 20 is magnetically susceptible whereby the lower reach 22 is attracted by the magnet means 48 and prevented from sagging below the frame 12. As can be seen in FIG. 4, the magnet means 48 is carried on a U-shaped support plate 63 which is mounted to a plate 64 forming part of the U-shaped frame 56. A wear plate 66, secured to the magnet means 48, is engaged by the lower reach 22 and has a relatively smooth surface which minimizes frictional heat generated by the passage of the lower reach 22.

As stated above, the movable belt 20 is magnetically susceptible and preferably comprises an endless strip of resilient material 68 having metal strands 70 embedded therein, extending longitudinally thereof and which are susceptible to magnetization by the magnet means 48. As best shown in FIG. 4A, each of the metal strands 70 preferably comprise a continuous strand which extends the complete length of the endless strip 68. With this arrangement, the tensile strength of the belt 20 is increased considerably.

An alternative embodiment of the movable belt 20' is illustrated in FIG. 5. The movable belt 20' comprises an endless strip of resilient material 68' having magnetically susceptible particles 72 dispersed therein. The particles 72 are magnetized by the magnet means 48 (FIG. 4) whereby the movable belt 20' is maintained engaged with the wear plate 66 (FIG. 4) and prevented from sagging therebelow.

*Magnetic transfer means 42*

Referring now to FIGS. 6 and 7, the magnetic transfer means 42 comprises, in general, a first arm segment 74, a second arm segment 76, and magnetic roller means 78. The first arm segment 74 is pivotally supported on journals 80 for arcuate movement substantially parallel with the direction of belt travel. The first arm segment 74 is pivotal through an angle indicated at A. The journals 80 are secured to spaced angle members 82 which, in turn, are supported on the intermediate lateral frame members 17. The first arm segment 74 extends upwardly between the spaced angle members 82 and is connected to the journals 80 by means of a shaft 84. Although not limited thereto, the magnetic roller means 78 preferably comprise those rollers described, illustrated and claimed in our U.S. Patent No. 3,224,757.

The upper end of the first arm segment 74 is pivotally connected to an actuator arm 86 which is operated by the pneumatic cylinder 44 (FIG. 2). Referring now to FIGS. 1 and 2, the actuator arm 86 is connected to all of the magnetic transfer means 42. The actuator arm 86 extends rearwardly of the frame 12 and is pivotally connected to a lever arm 88 secured to a shaft 90. The shaft 90 is, in turn, connected to a main lever arm 92 which is pivotally connected to a piston rod 94 of the pneumatic cylinder 44. In FIG. 2, the main lever arm 92 and all of the first arm segments 74 are shown in a generally vertical position. When the cylinder 44 is actuated, the main lever arm 92 is rotated to the dash-dot outline position whereupon the actuator arms 86 are moved rearwardly causing all of the arm segments 74 to be pivoted about the journals 80 to the inclined position shown in dash-dot outline in FIG. 7. Deactivation of the pneumatic cylinder 44, of course, causes the main lever arm 92 and all of the first arm segments 74 to return to their generally vertical position.

Returning now to FIGS. 6 and 7, the second arm segment 76 is pivotally connected at 96 to the first arm segment 74. The magnetic roller 78 is rotatable on a shaft 98 which, in turn, is secured to the lower end of the second arm segment 76. This first arm segment 74 carries an eccentric cam member 100 which is engageable with an upper surface 102 of the second arm segment 76 to maintain the second arm segment 76 at a preselected angular position relative to the first arm segment 74. As can be seen in FIG. 7, the second arm segment 76 is angled relative to the first arm segment 74 and extends forwardly thereof in the direction of belt travel. The cam member 100 is rotatable about the bolt 104 passing through the first arm segment 74 and is secured in an adjusted position by wing nut 106.

As explained above, the magnetic transfer means 42 are arranged such that the single sheet magnetically supported by the magnetic rollers 78 is accelerated in the direction of belt travel so as to minimize marking of the sheet when engaged by the moving belt. The magnetic transfer means 42 is also arranged such that the sheet is moved parallel to and with the lower reach at a speed greater than the speed at which the sheet is moved upwardly into engagement with the lower reach. For a better understanding of this operation, reference is directed to FIG. 8 wherein one of the magnetic transfer means 42 is schematically illustrated. The magnetic roller 78 engages a single sheet along a line which, in FIG. 8, is represented by a point of contact 108. As the first and second arm segments 74, 76 pivot as a unit about the shaft 84, the point of contact 108 will move along an arcuate path represented by the arc 110. The dash-dot illustration of the magnetic roller 78 corresponds to that position wherein the point of contact 108 is coincident with the bottom face of the lower reach 22. At this time, the sheet (not shown) being transferred by the magnetic transfer means 42 will engage the movable belt 20 and be conveyed thereby. The magnetic roller 78 will, of course, continue to pivot upwardly about the shaft 84 such that the point of contact 108 is spaced above the movable belt 20.

The arcuate movement of the point of contact 108 can be represented by two vectors, one labeled $V_h$ which corresponds to the horizontal velocity; and the other labeled $V_v$ which corresponds to the vertical velocity. The resultant of the vertical and horizontal vectors is labeled $V_r$. As can be seen, the magnitude of the horizontal velocity $V_h$ is greater than the magnitude of the vertical velocity $V_v$. Consequently, a single sheet being transferred by the magnetic transfer means 42 will move in a horizontal direction at a greater velocity than in a vertical direction. The single sheet will, therefore, be accelerated from a dead stop while resting on the stack 28 (FIG. 2) to a speed which prevents marking of the sheet when the sheet engages the movable belt 20.

As stated above, the angular position of the second arm segment 76 relative to the first arm segment 74 may be adjusted to change the position of the magnetic roller 78 relative to the movable belt 20 and, also, to place the magnetic roller at a position spaced from the stack 28 (FIG. 2) wherein it is incapable of attracting the single sheet 26. Adjustment in the angular position of the second arm segment 76 is provided by the eccentric cam member 100. As can be seen in FIG. 9, the cam member 100 is provided with an opening 112 which receives the bolt 104 (FIG. 7) and which has a central axis 114. The cam member 100 has, in this instance, a generally rectangular configuration including four cam edges 116, 118, 120, and 122. The opening 112 is offset from the geometric center of the cam member 100 such that the cam edges 116, 118, 120 and 122 are at different and sequentially greater distances from the central axis 114. For example, the cam edge 116 is closest to the central axis 114 while the cam edge 122 is the furthest from the central axis 114.

Each of the cam edges 116, 118, 120 and 122 is adapted to engage the upper surface 102 and maintain the second arm segment 76 at a predetermined angular position relative to the first arm segment 74. Referring to FIG. 10, four of the magnetic transfer means 42A, 42B, 42C and 42D are illustrated.

In the magnetic transfer means 42A, the cam edge 116 is engaged with the upper surface 102 to maintain the second arm segment 76 in a first or lowermost position. In this first position, the point of contact 108 is at the furthest possible distance below the movable belt 20.

In the magnetic transfer means 42B, the cam edge 118 engages the upper surface 102 to position the second arm segment 76 at a second position. The point of contact 108 of the magnetic roller 78 is closer to the movable belt 20.

In the magnetic transfer means 42C, the cam edge 120 engages the upper surface 102 to position the second arm segment 76 at a third position. The point of contact 108 of the magnetic roller 78 is, in this third position, even closer to the movable belt 20.

Finally, in the magnetic transfer means 42D, the cam edge 122 is engaged with the upper surface 102 to position the second arm segment 76 at a fourth position. The point of contact 108 of the magnetic roller 78 is spaced above the movable belt 20. Thus, in this fourth position the magnetic roller 78 is incapable of attracting a single sheet and, therefore, is rendered inoperative.

It should be noted, at this time, that the pneumatic cylinder 44 (FIG. 2) causes all of the magnetic transfer means to pivot about their shafts 84 at a substantially constant angular velocity each and every time a single sheet 26 is transferred. Consequently, the effect of adjusting the angular position of the second arm segment 76 relative to the first arm segment 74 is to reduce the time interval required by the magnetic roller 78 to travel between the stack 28 and the lower reach 22. Thus, the magnetic rollers 78 when disposed in the three positions illustrated by the magnetic transfer means 42A, 42B and 42C will require different time intervals to convey a single sheet to the lower reach 22. Hence, the speed of operation of the present magnetic conveyor 10 can be varied without detracting from the sheet transferring capability of the magnetic transfer means 42.

Alternative embodiments of the cam member are illustrated in FIGS. 11 and 12. Corresponding numerals will be employed to identify corresponding parts heretofore described.

In FIG. 11 there is illustrated a cam member 124 provided with an opening 112 having a center 114. The cam member 124 has a hexagonal configuration and provides a plurality of edges 126, 128, 130, 132, 134 and 136 each of which is at a different distance from the center 114. The cam member 124 likewise provides incremental adjustments in the position of the second arm segment 76 relative to the first arm segment 74.

In FIG. 12 there is illustrated a cam member 138 provided with an opening 112 having a center 114. The cam member 138 has a circular configuration and presents a peripheral edge 140. The cam member 138 likewise provides incremental adjustments in the position of the second arm segment 76 relative to the first arm segment 74.

The cam members 100, 124 and 138 provide the magnetic transfer means 42 with an additional advantage. It will be understood that it is highly desirous to have the points of contact 108 of all of the magnetic roller means 78 in a common horizontal plane. However, due to fabrication errors this is not always the case. In this instance, repositioning of the cam members 100, 124 or 138 will place the points of contact substantially in the desired common horizontal plane.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. Apparatus for conveying paramagnetic sheet material, said apparatus having an elongated support frame; magnet means extending along said support frame for attracting said paramagnetic sheet material; a wear plate positioned below said magnet means; at least one endless belt operably supported by said support frame and having a lower reach positioned below said wear plate and movable parallel thereto; and drive means for driving said endless belt; the width of the magnetic field produced by said magnet means being substantially equal to at least the width of said endless belt; said magnet means being adapted to attract paramagnetic sheet material into engagement with a lower reach for conveying said paramagnetic sheet material; the improvement comprising:
   magnetically susceptible elements distributed along the entire length of said endless belt and across a major portion of its width and being positioned above the lower face of said lower reach, said lower reach being attracted by said magnet means into sliding engagement with said wear plate whereby in the absence of paramagnetic sheet material said lower reach is prevented from sagging below said support frame out of contact with said wear plate.

2. The improvement defined in claim 1 wherein said magnetically susceptible elements comprise magnetizable particles embedded in said endless strip.

3. The improvement defined in claim 1 wherein said magnetically susceptible elements comprise metal strands embedded in said endless strip and extending along the length thereof.

4. The improvement defined in claim 1 wherein said magnetically susceptible elements comprise endless metal strands embedded in said endless strip and extending along the length thereof.

5. The improvement defined in claim 1 wherein said support frame is provided with a plurality of said endless belts positioned in laterally spaced-apart, substantially parallel relation, said endless belts acting in unison to convey said paramagnetic material.

6. In apparatus for transferring single sheets of paramagnetic material, said apparatus comprising a magnetic conveyor including an elongated support frame, magnet means extending along said support frame for attracting said paramagnetic material, at least one endless belt operably supported on said support frame and having a lower reach positioned below said support frame and running in a forward direction, drive means for driving said endless belt, a plurality of magnetic transfer means on opposite sides of said endless belt for transferring said sheet between a first position spaced below said lower reach and a second position wherein said sheet as attracted by said magnetic means and maintained engaged with said lower reach, and means for forcibly moving said plurality of magnetic transfer means between said first position and said second position, the improvement in each of said magnetic transfer means comprising:
   a first arm segment connected to said support frame for arcuate movement about a pivotal axis and substantially parallel with the direction of belt travel, said first arm segment being operated by said means for moving said magnetic transfer means;
   a second arm segment connected to said first arm segment at a location below said pivotal axis for movement therewith and having a lower end depending below said lower reach, and
   a magnetic roller means connected to said lower end of said second arm segment for magnetically supporting a said single sheet during transfer thereof between said first and second positions;
   said second arm segment being angled relative to said first arm segment and extending forwardly thereof in the direction of travel of said lower reach, whereby arcuate movement of said first and second arm segments as a unit, causes said magnetic roller means to move parallel to and with said lower reach at a speed greater than the speed at which said magnetic roller means moves in a direction normal to said lower reach.

7. The improvement defined in claim 6 including:
   means for connecting said one end of said second arm segment to said first arm segment for free pivotal movement relative thereto; and
   adjustable cam means carried by said first arm segment and engageable by said one end of said second arm segment for maintaining said second arm segment at a preselected one of a plurality of angular positions relative to said first arm segment.

8. The improvement defined in claim 7 wherein said adjustable cam means comprises:
   a cam member connected to said first arm segment for rotation about a rotational axis passing therethrough, said cam member having a plurality of edges disposed at a different distance from said rotational axis, said cam member being rotatable about said rotational axis to place each of said edges in engagement with said one end of said second arm segment to effect a change in said angular position of said second arm segment relative to said first arm segment.

References Cited

UNITED STATES PATENTS

| | | | |
|---|---|---|---|
| 2,839,651 | 6/1958 | Erickson | 198—193 |
| 1,809,076 | 6/1931 | Shinn | 271—74.1 |
| 2,228,913 | 12/1941 | Martin | 271—74.1 |
| 2,901,094 | 8/1959 | Jett | 198—204 |
| 3,003,460 | 10/1961 | Wilson | 198—41 |
| 3,162,297 | 12/1964 | Leach | 198—110 |
| 3,179,241 | 4/1965 | Kain | 198—41 |
| 3,203,531 | 8/1965 | Pretot | 198—40 |
| 3,224,757 | 12/1965 | Parke | 271—74.1 |

RICHARD E. AEGERTER, *Primary Examiner.*

U.S. Cl. X.R.

198—39